United States Patent
Zhang et al.

(10) Patent No.: US 10,057,832 B2
(45) Date of Patent: Aug. 21, 2018

(54) FTM PROTOCOL WITH SELECTABLE ACKNOWLEDGEMENT FORMAT

(71) Applicant: QUALCOMM Incorporated, San Diego, CA (US)

(72) Inventors: Ning Zhang, Saratoga, CA (US); Xiaoxin Zhang, Fremont, CA (US); Carlos Horacio Aldana, Mountain View, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/048,003

(22) Filed: Feb. 19, 2016

(65) Prior Publication Data

US 2017/0245193 A1    Aug. 24, 2017

(51) Int. Cl.
| | |
|---|---|
| *H04J 3/06* | (2006.01) |
| *H04W 40/02* | (2009.01) |
| *H04L 5/00* | (2006.01) |
| *H04L 27/26* | (2006.01) |
| *H04W 64/00* | (2009.01) |
| *H04W 84/12* | (2009.01) |

(52) U.S. Cl.
CPC ........... *H04W 40/02* (2013.01); *H04L 5/0055* (2013.01); *H04L 27/2601* (2013.01); *H04W 64/00* (2013.01); *H04W 84/12* (2013.01)

(58) Field of Classification Search
CPC .... H04W 40/02; H04W 84/12; H04L 5/0055; H04L 27/2601
USPC ........ 370/328, 329, 252, 253, 254, 350, 210
See application file for complete search history.

(56) References Cited

U.S. PATENT DOCUMENTS

| | | | | |
|---|---|---|---|---|
| 9,232,493 | B2* | 1/2016 | Zhang | ..................... G01S 11/02 |
| 9,474,041 | B1* | 10/2016 | Zhang | .................. H04W 64/00 |
| 9,730,179 | B2* | 8/2017 | Aldana | ................. H04W 64/00 |
| 2006/0176908 | A1 | 8/2006 | Kwon et al. | |
| 2014/0073352 | A1* | 3/2014 | Aldana | ..................... G01S 5/10 |
| | | | | 455/456.1 |
| 2014/0213193 | A1* | 7/2014 | Zhang | ..................... G01S 11/02 |
| | | | | 455/67.11 |

(Continued)

FOREIGN PATENT DOCUMENTS

| | | |
|---|---|---|
| WO | WO-2006083136 A1 | 8/2006 |
| WO | WO-2016043954 A1 | 3/2016 |
| WO | WO-2016130380 A1 | 8/2016 |

OTHER PUBLICATIONS

International Search Report and Written Opinion—PCT/US2017/013496—ISA/EPO—dated Apr. 26, 2017.

*Primary Examiner* — Chuong T Ho
(74) *Attorney, Agent, or Firm* — Paradice and Li LLP

(57) ABSTRACT

Apparatuses and methods are disclosed that may perform ranging operations between a first device and a second device. The second device transmits an FTM request frame indicating a number of supported non-legacy ACK frame formats, and receives a first FTM frame indicating capabilities of the first device to receive each of the non-legacy ACK frame formats supported by the second device. The second device selects one of the non-legacy ACK frame formats or a legacy ACK frame format based, at least in part, on the indicated capabilities of the first device, and then transmits ACK frames using the selected frame format during the ranging operation.

22 Claims, 13 Drawing Sheets

(56) References Cited

U.S. PATENT DOCUMENTS

| | | | |
|---|---|---|---|
| 2014/0355461 A1* | 12/2014 | Aldana | G01S 5/00 370/252 |
| 2014/0355462 A1* | 12/2014 | Aldana | G01S 5/00 370/252 |
| 2015/0049716 A1* | 2/2015 | Gutierrez | H04W 84/12 370/329 |
| 2015/0094103 A1* | 4/2015 | Wang | H04W 4/023 455/456.6 |
| 2015/0341750 A1* | 11/2015 | Hayes | H04W 64/003 370/328 |
| 2016/0021496 A1* | 1/2016 | Tamhane | H04W 4/02 455/456.2 |
| 2016/0119889 A1* | 4/2016 | Zhang | G01S 11/02 370/350 |
| 2016/0150499 A1* | 5/2016 | Aldana | H04L 5/0055 455/456.2 |
| 2016/0150500 A1 | 5/2016 | Agrawal et al. | |
| 2016/0345277 A1* | 11/2016 | Segev | H04W 56/001 |
| 2017/0013412 A1* | 1/2017 | Steiner | H04W 4/04 |

\* cited by examiner

FIG. 8

| 801 | 802 | 803 | 804 | 805 | 806 | 807 | 808 | 809 | 810 | 811 | 812 |
|---|---|---|---|---|---|---|---|---|---|---|---|
| Category | Public Action | Dialogue Token | Follow Up Dialogue Token | TOD | TOA | TOD Error | TOA Error | LCI Report (optional) | Location Civic Report (optional) | Fine Timing Measurement Parameters (optional) | ACK Capabilities (optional) |

| 901 | 902 | 903 | 904 |
|---|---|---|---|
| Frame Control | Duration | RA | FCS |

900

| L-STF 1001 | L-LTF 1002 | L-SIG 1003 | VHT-SIG-A$_1$ 1014 | VHT-SIG-A$_2$ 1015 | VHT-STF 1016 | VHT-LTF 1017 | VHT-SIG-B 1018 |

| L-STF 1001 | L-LTF 1002 | L-SIG 1003 | RL-SIG 1024 | HE-SIG-A1/HE-SIG-A2 1025 | HE-SIG-B 1026 | HE-STF 1027 | HE-LTF 1028 |

1000D

FIG. 10D ns by the one or more processors may cause the second device to: transmit, to the first device, a fine timing measurement (FTM) request frame indicating a number of non-legacy acknowledgement (ACK) frame formats supported by the second device; receive, from the first device, a first FTM frame indicating capabilities of the first device to receive each of the number of non-legacy ACK frame formats supported by the second device; select one of the number of non-legacy ACK frame formats or a legacy ACK frame format based, at least in part, on the indicated capabilities of the first device; and transmit an ACK frame to the first device in response to reception of the first FTM frame, the ACK frame transmitted using the selected ACK frame format.

FTM PROTOCOL WITH SELECTABLE ACKNOWLEDGEMENT FORMAT

TECHNICAL FIELD

The example embodiments relate generally to wireless networks, and specifically to ranging operations performed between wireless devices.

BACKGROUND OF RELATED ART

The recent proliferation of Wi-Fi® access points in wireless local area networks (WLANs) has made it possible for positioning systems to use these access points for position determination, especially in areas where there are a large concentration of active Wi-Fi access points (e.g., urban cores, shopping centers, office buildings, sporting venues, and so on). For example, a wireless device such as a cell phone or tablet computer may use the round trip time (RTT) of signals exchanged with an access point (AP) to determine the distance between the wireless device and the AP. Once the distances between the wireless device and three APs having known locations are determined, the location of the wireless device may be determined using trilateration techniques.

Because ranging operations are becoming more important for position determination, it is desirable to increase the accuracy of ranging operations.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed that may allow wireless devices to increase the accuracy of ranging operations by transmitting both fine timing measurement (FTM) frames and acknowledgement (ACK) frames in non-legacy frame formats. The non-legacy frame formats may be associated with, for example, a high efficiency (HE) protocol, a very high throughput (VHT) protocol, a high throughput (HT) protocol, and/or any other high throughput protocol subsequently adopted by the Institute of Electrical and Electronics Engineers.

In one aspect, a method is disclosed for initiating a ranging operation between a first device and a second device. The method may be performed by the second device by: transmitting, to the first device, a fine timing measurement (FTM) request frame indicating a number of non-legacy acknowledgement (ACK) frame formats supported by the second device; receiving, from the first device, a first FTM frame indicating capabilities of the first device to receive each of the number of non-legacy ACK frame formats supported by the second device; selecting one of the number of non-legacy ACK frame formats or a legacy ACK frame format based, at least in part, on the indicated capabilities of the first device; and transmitting an ACK frame to the first device in response to reception of the first FTM frame, the ACK frame transmitted using the selected ACK frame format.

In another aspect, a second device configured to initiate a ranging operation with a first device is disclosed. The second device may include one or more processors and a memory configured to store instructions. Execution of the instructions by the one or more processors may cause the second device to: transmit, to the first device, a fine timing measurement (FTM) request frame indicating a number of non-legacy acknowledgement (ACK) frame formats supported by the second device; receive, from the first device, a first FTM frame indicating capabilities of the first device to receive each of the number of non-legacy ACK frame formats supported by the second device; select one of the number of non-legacy ACK frame formats or a legacy ACK frame format based, at least in part, on the indicated capabilities of the first device; and transmit an ACK frame to the first device in response to reception of the first FTM frame, the ACK frame transmitted using the selected ACK frame format.

In another aspect, a non-transitory computer-readable storage medium is disclosed. The non-transitory computer-readable storage medium may store one or more programs containing instructions that, when executed by one or more processors of a second device, cause the second device to initiate a ranging operation with a first device by performing a number of operations. The number of operations may include transmitting, to the first device, a fine timing measurement (FTM) request frame indicating a number of non-legacy acknowledgement (ACK) frame formats supported by the second device; receiving, from the first device, a first FTM frame indicating capabilities of the first device to receive each of the number of non-legacy ACK frame formats supported by the second device; selecting one of the number of non-legacy ACK frame formats or a legacy ACK frame format based, at least in part, on the indicated capabilities of the first device; and transmitting an ACK frame to the first device in response to reception of the first FTM frame, the ACK frame transmitted using the selected ACK frame format.

In another aspect, a second device configured to initiate a ranging operation with a first device is disclosed. The second device may include means for transmitting, to the first device, a fine timing measurement (FTM) request frame indicating a number of non-legacy acknowledgement (ACK) frame formats supported by the second device; means for receiving, from the first device, a first FTM frame indicating capabilities of the first device to receive each of the number of non-legacy ACK frame formats supported by the second device; means for selecting one of the number of non-legacy ACK frame formats or a legacy ACK frame format based, at least in part, on the indicated capabilities of the first device; and means for transmitting an ACK frame to the first device in response to reception of the first FTM frame, the ACK frame transmitted using the selected ACK frame format.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 8 depicts an example FTM frame in accordance with example embodiments.

FIG. 9 depicts an example ACK frame that may be used in accordance with the example embodiments.

FIG. 10C depicts a very high throughput (VHT) preamble of a frame that may be transmitted in accordance with example embodiments.

FIG. 10D depicts a high efficiency (HE) preamble of a frame that may be transmitted in accordance with example embodiments.

DETAILED DESCRIPTION

Figure 1:
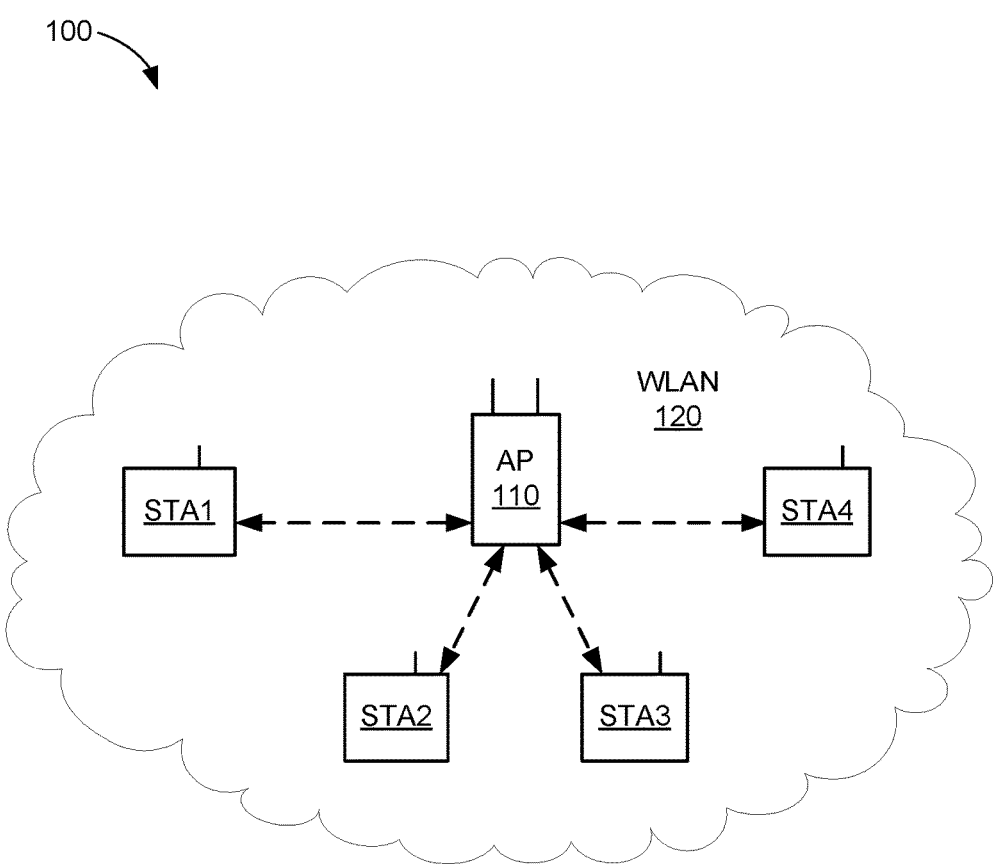
FIG. 1 is a block diagram of a WLAN system within which the example embodiments may be implemented.

The example embodiments are described below in the context of ranging operations performed by and between Wi-Fi enabled devices for simplicity only. It is to be understood that the example embodiments are equally applicable for performing ranging operations using signals of other various wireless standards or protocols, and for performing ranging operations between various devices (e.g., between a STA and a wireless AP, between APs, between STAs, and so on). Thus, although the example embodiments are described below in the context of a WLAN system, the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms WLAN and Wi-Fi® may include communications governed by the IEEE 802.11 standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein.

In addition, although described below in terms of an infrastructure WLAN system including one or more APs and a number of STAs, the example embodiments are equally applicable to other WLAN systems including, for example, multiple WLANs, Independent Basic Service Set (IBSS) systems, peer-to-peer systems (e.g., operating according to the Wi-Fi Direct protocols), and/or Hotspots. In addition, although described herein in terms of exchanging data frames between wireless devices, the example embodiments may be applied to the exchange of any data unit, packet, frame, and/or signal between wireless devices. Thus, the term "frame" may include any signal, frame, packet, or data unit such as, for example, protocol data units (PDUs), media access control (MAC) protocol data units (MPDUs), and physical (PHY) layer convergence procedure protocol data units (PPDUs). The term "A-MPDU" may refer to aggregated MPDUs.

Further, as used herein, the term "HT" may refer to a high throughput frame format or protocol defined, for example, by the IEEE 802.11n standards; the term "VHT" may refer to a very high throughput frame format or protocol defined, for example, by the IEEE 802.11ac standards; the term "HE" may refer to a high efficiency frame format or protocol defined, for example, by the IEEE 802.11ax standards; and the term "non-HT" may refer to a legacy frame format or protocol defined, for example, by the IEEE 802.11a/g standards. Thus, the terms "legacy" and "non-HT" may be used interchangeably herein. Further, as used herein, the term "legacy ACK frame format" may refer to an ACK frame format defined by the IEEE 802.11a/g standards, and the term "non-legacy ACK frame format" may refer to an ACK frame format defined by the IEEE 802.11n/ac/ax standards and/or to high throughput ACK frame formats that may be defined in one or more future IEEE 802.11 standards.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise.

In the following description, numerous specific details are set forth such as examples of specific components, circuits, and processes to provide a thorough understanding of this disclosure. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scopes all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique media access control (MAC) address that is programmed therein by, for example, the manufacturer of the access point. Similarly, each of stations STA1-STA4 is also assigned a unique MAC address. For some embodiments, the wireless system 100 may correspond to a multiple-input multiple-output (MIMO) wireless network, and may support single-user MIMO (SU-MIMO) and multi-user (MU-MIMO) communications. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5A-5D, and 11.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 5A-5D, and 11.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

For at least some embodiments, each of the stations STA1-STA4 and AP 110 may include radio frequency (RF) ranging circuitry (e.g., formed using well-known software modules, hardware components, and/or a suitable combination thereof) that may be used to estimate the distance between itself and another Wi-Fi enabled device and to determine the location of itself, relative to one or more other wireless devices, using ranging techniques described herein. In addition, each of the stations STA1-STA4 and/or AP 110 may include a local memory (not shown in FIG. 1 for simplicity) to store a cache of Wi-Fi access point and/or station data.

For at least some embodiments, ranging operations described herein may be performed without using the AP 110, for example, by having a number of the stations operating in an ad-hoc or peer-to-peer mode, thereby allowing the stations to range one another even when outside the reception range of AP 110 or a visible WLAN (or other wireless network). In addition, for at least some example embodiments, ranging operations described herein may be performed between two APs that are in wireless range of each other.

Figure 2:
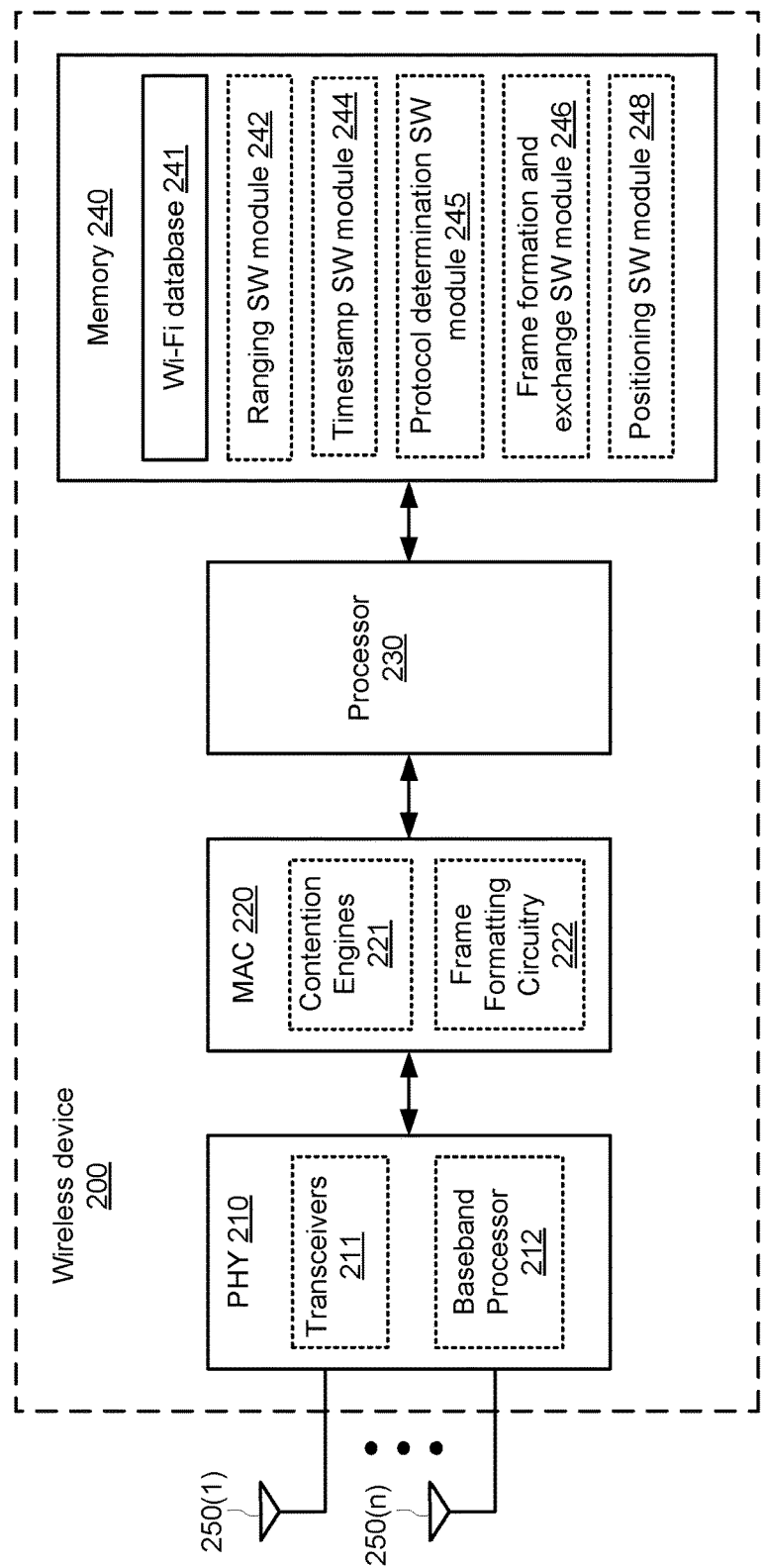
FIG. 2 is a block diagram of a wireless device in accordance with example embodiments.

FIG. 2 shows a wireless device 200 that may be one embodiment of the stations STA1-STA4 and/or AP 110 of FIG. 1. The wireless device 200 may include a PHY device 210 including at least a number of transceivers 211 and a baseband processor 212, may include a MAC 220 including at least a number of contention engines 221 and frame formatting circuitry 222, may include a processor 230, may include a memory 240, and may include a number of antennas 250(1)-250(n). The transceivers 211 may be coupled to antennas 250(1)-250(n), either directly or through an antenna selection circuit (not shown for simplicity). The transceivers 211 may be used to transmit signals to and receive signals from AP 110, other stations, and/or other suitable wireless devices (see also FIG. 1), and may be used to scan the surrounding environment to detect and identify nearby access points and other wireless devices (e.g., within wireless range of wireless device 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the wireless device 200 may be configured for MIMO operations. The MIMO operations may include SU-MIMO operations and/or MU-MIMO operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to one or more shared wireless mediums, and may also store packets for transmission over the one or more shared wireless mediums. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include a Wi-Fi database 241 that may store location data, configuration information, data rates, MAC addresses, and other suitable information about (or pertaining to) a number of access points, stations, and/or other wireless devices. The Wi-Fi database 241 may also store profile information for a number of wireless devices. The profile information for a given wireless device may include information including, for example, the wireless device's service set identification (SSID), channel information, received signal strength indicator (RSSI) values, goodput values, channel state information (CSI), and connection history with wireless device 200.

Memory 240 may also include a non-transitory computer-readable medium (e.g., one or more nonvolatile memory elements, such as EPROM, EEPROM, Flash memory, a hard drive, and so on) that may store the following software (SW) modules:

- a ranging SW module 242 to determine RTT values and/or to estimate the distance between wireless device 200 and one or more other devices, for example, as described below for one or more operations of FIGS. 5A-5D, and 11;
- a timestamp SW module 244 to capture timestamps of signals received by wireless device 200 (e.g., TOA information) and/or to capture timestamps of signals transmitted from wireless device 200 (e.g., TOD information), for example, as described below for one or more operations of FIGS. 5A-5D, and 11;
- a protocol determination SW module 245 to determine the frame format or protocol capabilities of one or more other wireless devices, to announce the frame format or protocol capabilities of wireless device 200 to one or more other wireless devices, and/or to select a frame format or protocol for transmitting frames (e.g., ACK frames, FTM frames, and/or other frames) to one or more other wireless devices during ranging operations, for example, as described below for one or more operations of FIGS. 5A-5D, and 11;
- a frame formation and exchange SW module 246 to create, transmit, and/or receive frames to and from other wireless devices, to embed frame format or protocol capability information into frames transmitted to other wireless devices, and/or to format ACK frames based, at least in part, on the frame format or protocol capabilities of other wireless devices, for example, as described below for one or more operations of FIGS. 5A-5D, and 11; and
- a positioning SW module 248 to determine the location of wireless device 200 based, at least in part, on the distances determined by the ranging SW module 242, for example, as described below for one or more operations of FIGS. 5A-5D, and 11.

Each software module includes instructions that, when executed by processor 230, cause the wireless device 200 to perform the corresponding functions. The non-transitory computer-readable medium of memory 240 thus includes instructions for performing all or a portion of the operations of FIGS. 5A-5D, and 11.

Processor 230, which is coupled to MAC 220 and memory 240, may be one or more suitable processors capable of executing scripts or instructions of one or more software programs stored in wireless device 200 (e.g., within memory 240). For example, processor 230 may execute the ranging SW module 242 to determine RTT values and/or to estimate the distance between wireless device 200 and one or more other devices. Processor 230 may execute the timestamp SW module 244 to capture timestamps of signals received by wireless device 200 (e.g., TOA information) and/or to capture timestamps of signals transmitted from wireless device 200 (e.g., TOD information). Processor 230 may execute the protocol determination SW module 245 to determine the frame format or protocol capabilities of one or more other wireless devices, to announce the frame format or protocol capabilities of wireless device 200 to one or more other wireless devices, and/or to select a frame format or protocol for transmitting frames (e.g., ACK frames, FTM frames, and/or other frames) to one or more other wireless devices during ranging operations. Processor 230 may execute the frame formation and exchange SW module 246 to create, transmit, and/or receive frames to and from other wireless devices, to embed frame format or protocol capability information into frames transmitted to other wireless devices, and/or to format ACK frames based, at least in part, on the frame format or protocol capabilities of other wireless devices. Processor 230 may execute the positioning SW module 248 to determine the location of wireless device 200 based, at least in part, on the distances determined by the ranging SW module 242.

Figure 3:
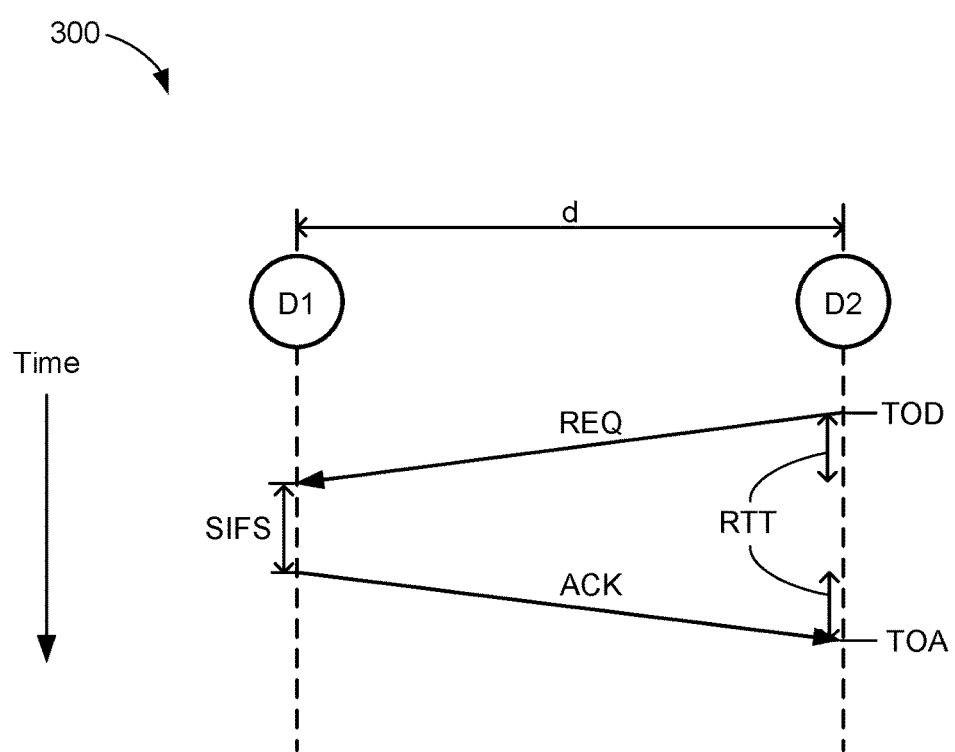
FIG. 3 is a signal diagram of an example ranging operation.

As mentioned above, the distance between a pair of devices may be determined using the RTT of signals exchanged between the devices. For example, FIG. 3 shows a signal diagram of an example ranging operation 300 between a first device D1 and a second device D2. The distance (d) between the first device D1 and the second device D2 may be estimated as d=c*RTT/2, where c is the speed of light, and RTT is the summation of the actual signal propagation times of a request (REQ) frame and an acknowledgement (ACK) frame exchanged between device D1 and device D2. Device D1 and device D2 may each be, for example, an access point (e.g., AP 110 of FIG. 1), a station (e.g., one of stations STA1-STA4 of FIG. 1), or another suitable wireless device (e.g., wireless device 200 of FIG. 2).

More specifically, device D2 may estimate the RTT between itself and device D1 using the time of departure (TOD) of the REQ frame transmitted from device D2, the time of arrival (TOA) of the ACK frame received by device D2, and the Short Interframe Spacing (SIFS) duration of device D1. The SIFS duration indicates the duration of time between device D1 receiving the REQ frame and transmitting the ACK frame. The SIFS duration, a range of values for which are provided by the IEEE 802.11 standards, provides Wi-Fi enabled devices time to switch their transceivers from a receive mode (e.g., to receive the REQ frame) to a transmit mode (e.g., to transmit the ACK frame).

Because different make-and-models (and sometimes even same make-and-models) of communication devices have different processing delays, the precise value of SIFS may vary between devices (and even between successive frame receptions/transmissions in the same device). As a result, the value of SIFS is typically estimated, which often leads to errors in estimating the distance between two devices. More specifically, the IEEE 802.11 standards define the SIFS duration as 10 us+/−900 ns at 2.4 GHz, 16 us+/−900 ns at 5 GHz, and 3 us+/−900 ns at 60 GHz. These "standard" SIFS durations include tolerances that may decrease the accuracy of RTT estimates. For example, even if the SIFS duration of device D1 may be estimated within +/−25 ns, a ranging error of +/−7.5 meters may result (which may be unacceptable for many positioning systems).

Figure 4:
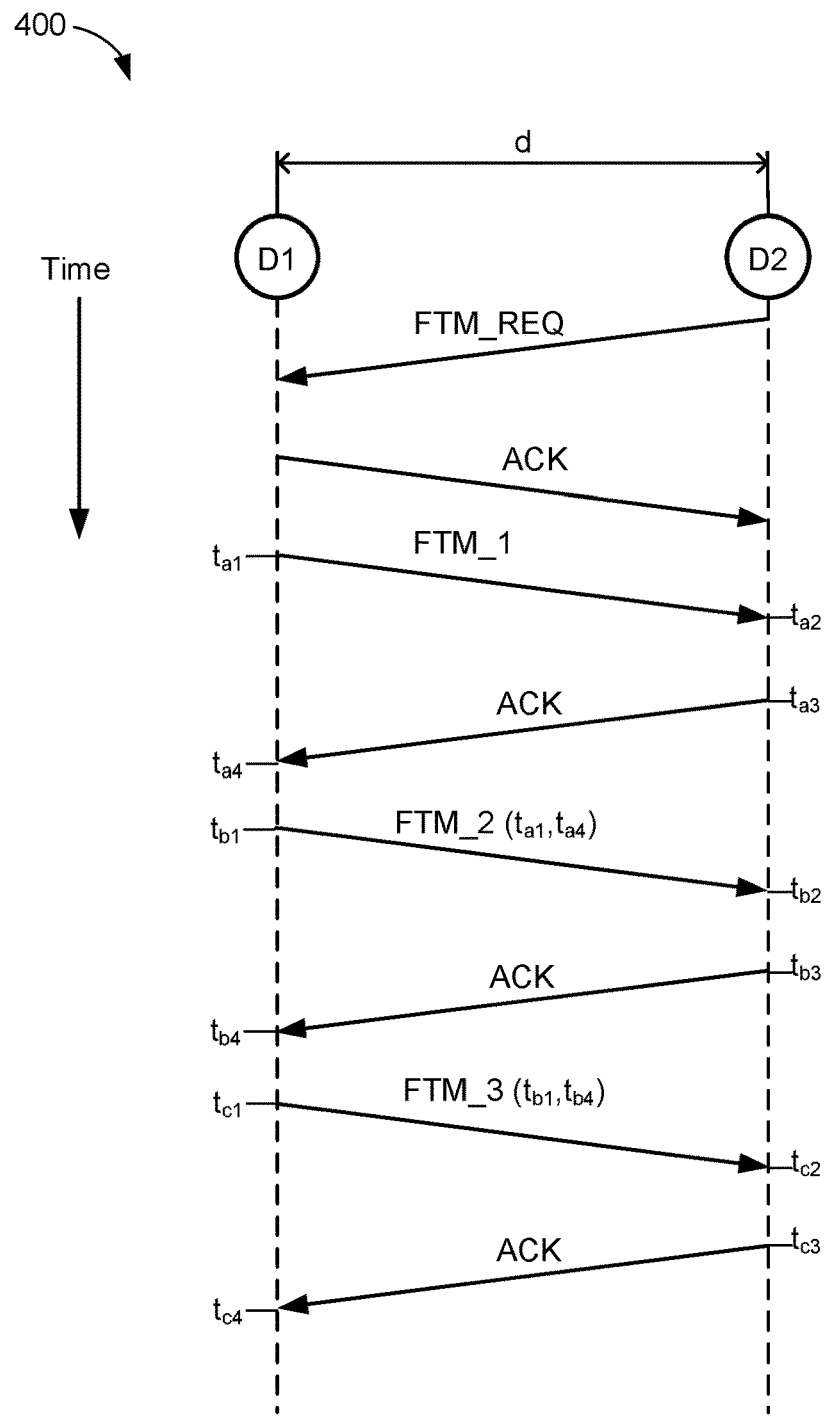
FIG. 4 is a signal diagram of another example ranging operation.

To reduce ranging errors resulting from uncertainties in the value of SIFS, recent revisions to the IEEE 802.11 standards call for each ranging device to capture timestamps of incoming and outgoing frames so that the value of RTT may be determined without using SIFS. For example, FIG. 4 shows a signal diagram of an example ranging operation 400 between device D1 and device D2 performed using Fine Timing Measurement (FTM) frames in accordance with the IEEE 802.11 REVmc standards. Device D1 and device D2 may each be, for example, an access point (e.g., AP 110 of FIG. 1), a station (e.g., one of stations STA1-STA4 of FIG. 1), or other suitable wireless device (e.g., wireless device 200 of FIG. 2). For the example of FIG. 4, device D2 requests the ranging operation; thus, device D2 is the initiator device (or alternatively the requestor device) and device D1 is the responder device. Note that the term "initiator device" may also refer to an initiator STA, and the term "responder device" may also refer to a responder STA.

Device D2 may request or initiate the ranging operation by transmitting an FTM request (FTM_REQ) frame to device D1. The FTM_REQ frame may also include a request for device D1 to capture timestamps (e.g., TOA information) of frames received by device D1 and to capture timestamps (e.g., TOD information) of frames transmitted from device D1. Device D1 receives the FTM_REQ frame, and may acknowledge the requested ranging operation by transmitting an acknowledgement (ACK) frame to device D2. The ACK frame may indicate whether device D1 is capable of capturing the requested timestamps. It is noted that the exchange of the FTM_REQ frame and the ACK frame is a handshake process that not only signals an intent to perform a ranging operation but also allows devices D1 and D2 to determine whether each other supports capturing timestamps.

At time $t_{a1}$, device D1 transmits a first FTM (FTM_1) frame to device D2, and may capture the TOD of the FTM_1 frame as time $t_{a1}$. Device D2 receives the FTM_1 frame at time $t_{a2}$, and may capture the TOA of the FTM_1 frame as time $t_{a2}$. Device D2 responds by transmitting an ACK frame to device D1 at time $t_{a3}$, and may capture the TOD of the ACK frame as time $t_{a3}$. Device D1 receives the ACK frame at time $t_{a4}$, and may capture the TOA of the ACK frame at time $t_{a4}$. At time $t_{b1}$, device D1 transmits to device D2 a second FTM (FTM_2) frame that includes the timestamps captured at times $t_{a1}$ and $t_{a4}$ (e.g., the TOD of the FTM_1 frame and the TOA of the ACK frame). Device D2 receives the FTM_2 frame at time $t_{b2}$, and may capture its timestamp as time $t_{b2}$. Device D2 transmits an ACK frame to device D1 at time $t_{b3}$. Device D1 receives the ACK frame at time $t_{b4}$. This process may continue for any number of subsequent FTM and ACK frame exchanges between devices D1 and D2, for example, where device D1 embeds the timestamps of a given FTM and ACK frame exchange into a subsequent FTM frame transmitted to device D2.

Upon receiving the FTM_2 frame at time $t_{b2}$, device D2 has timestamp values for times $t_{a1}$, $t_{a2}$, $t_{a3}$, and $t_{a4}$ that correspond to the TOD of the FTM_1 frame transmitted from device D1, the TOA of the FTM_1 frame at device D2, the TOD of the ACK frame transmitted from device D2, and the TOA of the ACK frame at device D1, respectively. Thereafter, device D2 may determine RTT as $(t_{a4}-t_{a3})+(t_{a2}-t_{a1})$. Because the RTT estimate does not involve estimating SIFS for either device D1 or device D2, the RTT estimate does not involve errors resulting from uncertainties of SIFS durations. Consequently, the accuracy of the resulting estimate of the distance between devices D1 and D2 is improved (e.g., as compared to the ranging operation 300 of FIG. 3). A device may perform this ranging operation with at least three other devices having known locations, and use known trilateration techniques to estimate its location.

The accuracy of the RTT estimate between device D1 and device D2 may be proportional to the frequency bandwidth (e.g., the channel width) used for transmitting the FTM and ACK frames. As a result, ranging operations for which the FTM and ACK frames are transmitted using a relatively large frequency bandwidth may be more accurate than ranging operations for which the FTM and ACK frames are transmitted using a relatively small frequency bandwidth. For example, ranging operations performed using FTM frame exchanges on an 80 MHz-wide channel are more accurate than ranging operations performed using FTM frame exchanges on a 40 MHz-wide channel, which in turn are more accurate than ranging operations performed using FTM frame exchanges on a 20 MHz-wide channel.

In addition, because Wi-Fi ranging operations are typically performed using frames transmitted as orthogonal frequency-division multiplexing (OFDM) symbols, the accuracy of RTT estimates may be proportional to the number of tones (e.g., the number of OFDM sub-carriers) used to transmit the FTM and ACK frames between ranging devices. For example, while a legacy (e.g., non-HT) frame may be transmitted on a 20 MHz-wide channel using 52 tones, an HT frame or VHT frame may be transmitted on a 20 MHz-wide channel using 56 tones, and an HE frame may be transmitted on a 20 MHz-wide channel using 242 tones. Thus, for a given frequency bandwidth or channel width, HT/VHT/HE frames use more tones than non-HT frames, and may therefore provide more accurate channel estimates and RTT estimates than non-HT frames. Accordingly, ranging operations performed with HT/VHT/HE frames may be more accurate than ranging operations performed with non-HT frames.

The IEEE 802.11 REVmc standards allow FTM frames (e.g., the FTM_1 frame, the FTM_2 frame, and the FTM_3 frame of the example ranging operation 400 of FIG. 4) to be transmitted using an HT format, a VHT format, an HE format, and/or a legacy (e.g., non-HT) format. However, the IEEE 802.11REVmc standards do not specify a particular format or protocol for ACK frames transmitted during ranging operations. Typically, legacy or non-HT ACK frames are (by default) transmitted by the initiator device during FTM ranging operations (e.g., such as the example ranging operation 400 of FIG. 4). Because non-HT ACK frames are transmitted using fewer tones than ACK frames transmitted using HT, VHT, and HE formats, performing ranging operations using non-HT ACK frames may undesirably limit the accuracy of such ranging operations. In addition, the IEEE 802.11ax standards target long delay spread channels for outdoor wireless transmissions, and increase both the guard interval and the OFDM symbol length (e.g., as compared with earlier protocols defined in the IEEE 802.11a/g/n/ac standards). The longer guard intervals associated with the IEEE 802.11ax standards may further increase the accuracy of ranging operations performed using HE frame exchanges in long delay spread channels.

Thus, it would be desirable to perform ranging operations using not only FTM frames transmitted using HT/VHT/HE formats but also using ACK frames transmitted using HT/VHT/HE formats, for example, to increase the accuracy of ranging operations (e.g., as compared with the example ranging operation 400 of FIG. 4). These are at least some of the technical problems to be solved by the example embodiments.

In accordance with the example embodiments, methods and apparatuses are disclosed that may allow wireless devices to perform ranging operations using FTM and ACK frames transmitted in an HT, VHT, and/or HE format (e.g., rather than using, by default, non-HT ACK frames for ranging operations). Because ACK frames in HT, VHT, and HE formats are transmitted using more tones than non-HT ACK frames, ranging operations in accordance with the example embodiments may achieve more accurate channel estimates and/or more accurate RTT estimates than conventional ranging operations. Additional increases in ranging accuracy may be achieved by using HE ACK frames, which as mentioned above have longer guard intervals than other ACK frame formats. These and other details of the example embodiments, which provide one or more technical solutions to the aforementioned technical problems, are described in more detail below.

Figure 5A:
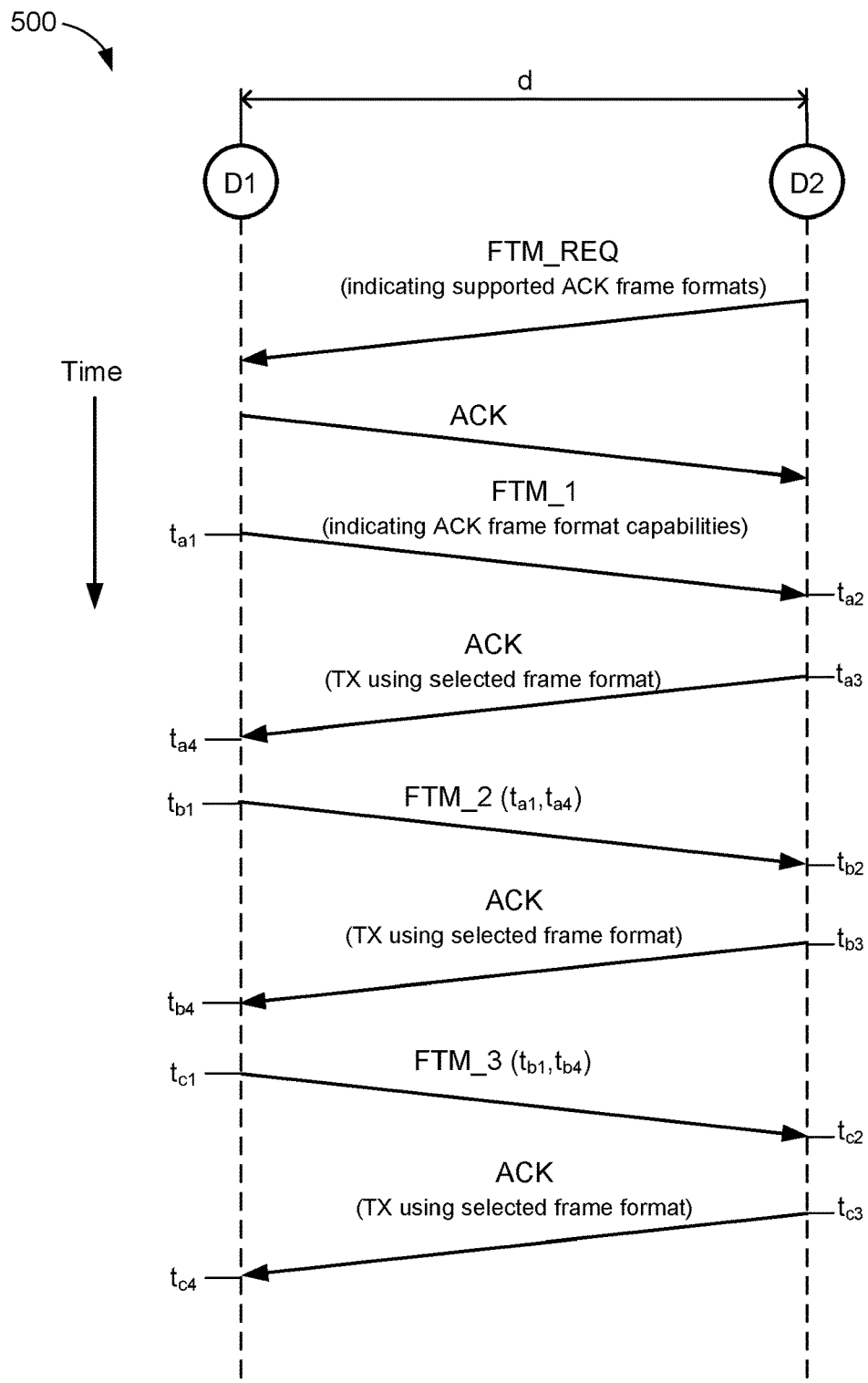
FIG. 5A is a signal diagram of a ranging operation in accordance with example embodiments.
Figure 5B:
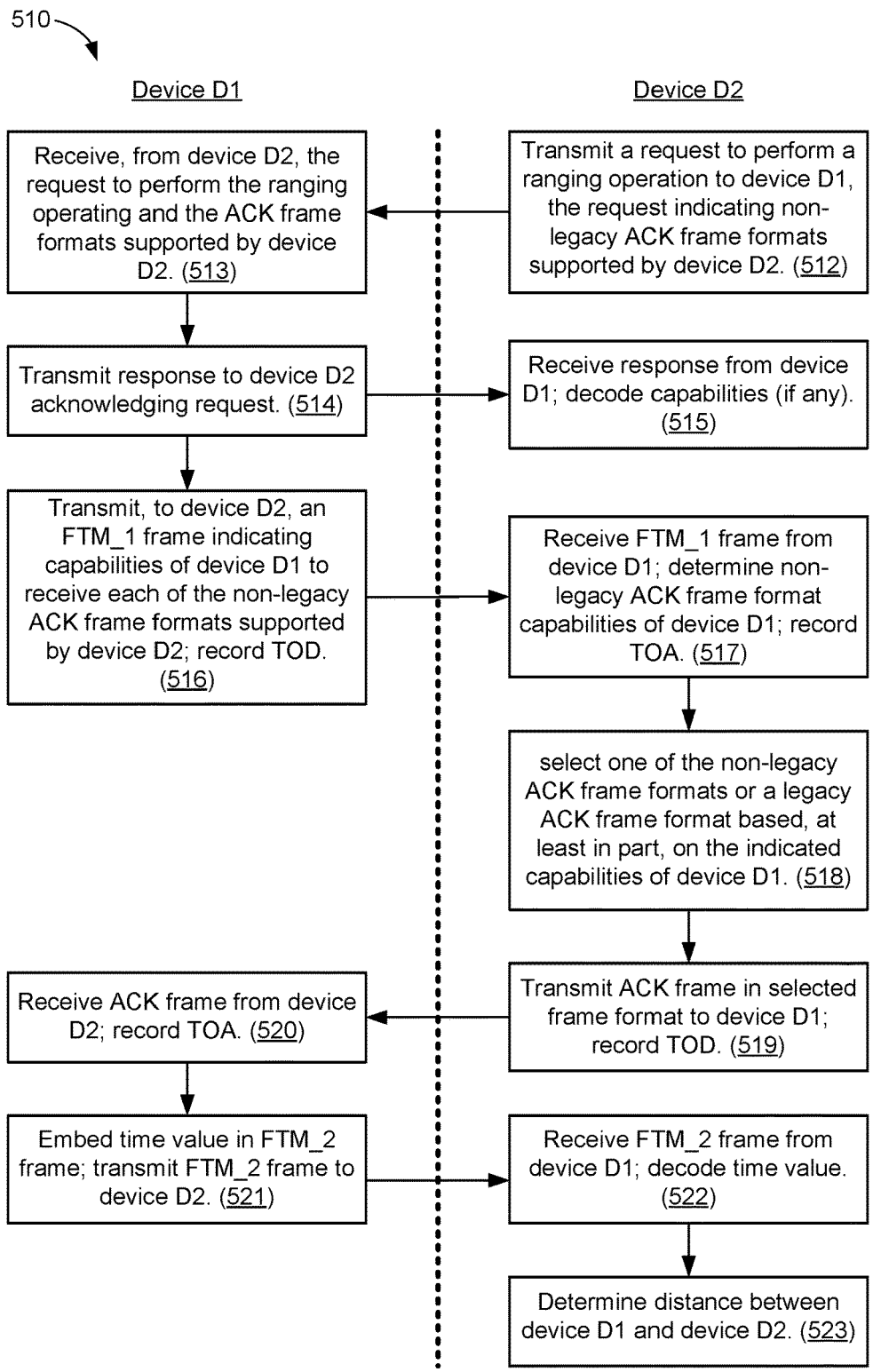
FIG. 5B is a sequence diagram depicting the ranging operation of FIG. 5A in accordance with example embodiments.

FIG. 5A shows a signal diagram of a ranging operation 500 between a first device D1 and a second device D2 in accordance with example embodiments, and FIG. 5B shows a sequence diagram 510 depicting the example ranging operation 500 of FIG. 5A. Device D1 and device D2 may each be, for example, an access point (e.g., AP 110 of FIG. 1), a station (e.g., one of stations STA1-STA4 of FIG. 1), or another suitable wireless device (e.g., wireless device 200 of FIG. 2).

As the initiator device, device D2 may transmit an FTM_REQ frame to device D1, the FTM_REQ frame requesting device D1 to perform a ranging operation and indicating a number of types of non-legacy ACK frame formats supported by device D2 (512). More specifically, in some aspects, the FTM_REQ frame may include an ACK capabilities field that indicates whether device D2 supports transmitting ACK frames in the HE format, the VHT format, and/or the HT format (or any other suitable non-legacy format). The ACK capabilities field, which may be included within or appended to the FTM_REQ frame in any suitable manner, is described in more detail below with respect to FIGS. 6-7. In other aspects, the non-legacy ACK frame formats supported by device D2 may be indicated using a number of reserved bits of the FTM_REQ frame.

For at least one implementation in which device D2 is an access point, device D2 may indicate its non-legacy ACK frame format capabilities in beacon frames. For example, beacon frames transmitted (e.g., broadcasted) by device D2 may include an information element (IE) or a vendor-specific information element (VSIE) that contains the non-legacy ACK frame format capabilities of device D2. The IE or VSIE may be embedded within or appended to the beacon frame in any suitable manner. In other aspects, the non-legacy ACK frame formats supported by device D2 may be indicated using a number of reserved bits of the beacon frame.

For other embodiments, the FTM_REQ frame may indicate a preferred or desired non-legacy ACK frame format (e.g., according to HE, VHT, or HT protocols) and/or may request device D1 to transmit subsequent FTM frames using a selected non-legacy frame format (e.g., according to HE, VHT, or HT protocols). For these other embodiments, an indication of a preferred ACK frame format and/or an indication of a selected frame format may be included within one or more capability fields included within (or appended to) the FTM_REQ frame (or within a number of reserved bits of the FTM_REQ frame).

Device D1 may receive the request to perform the ranging operation and the non-legacy ACK frame formats supported by device D2 (513). For example, device D1 may receive the FTM_REQ frame, and decode information contained in the ACK capabilities field to determine whether device D2 supports transmitting ACK frames in the HE format, the VHT format, and/or the HT format. Device D1 may respond to the request by transmitting a response to device D2 (514). For some implementations, the response may be an ACK frame, as depicted in FIG. 5A. The ACK frame may acknowledge the requested ranging operation, may indicate whether device D1 is capable of capturing timestamps, and/or may indicate a number of ranging capabilities of device D1 (e.g., the ability to estimate angle of arrival information and/or angle of departure information). Device D2 may receive the response from device D1, and decode the capabilities (if any) provided by device D1 (515).

Device D1 may determine whether it is capable of receiving the non-legacy ACK frame formats supported by device D2, may transmit an FTM_1 frame indicating its capabilities to receive each of the non-legacy ACK frame formats supported by device D2, and may record the TOD of the FTM_1 frame as time $t_{a1}$ (516). More specifically, in some aspects, the FTM_1 frame may include an ACK capabilities field that indicates whether device D1 supports receiving ACK frames in the HE format, the VHT format, and/or the HT format (or any other suitable non-legacy format). The ACK capabilities field, which may be included within or appended to the FTM_1 frame in any suitable manner, is described in more detail below with respect to FIGS. 7-8. In other aspects, the non-legacy ACK frame formats supported by device D1 may be indicated using a number of reserved bits of the FTM_1 frame.

For at least one implementation in which device D1 is an access point, device D1 may indicate its non-legacy ACK frame format capabilities in beacon frames. For example, beacon frames transmitted (e.g., broadcasted) by device D1 may include an IE or VSIE that contains the non-legacy ACK frame format capabilities of device D1. The IE or VSIE may be embedded within or appended to the beacon frame in any suitable manner. In other aspects, the non-legacy ACK frame formats supported by device D1 may be indicated using a number of reserved bits of the beacon frame.

Device D2 receives the FTM_1 frame from device D1 at time $t_{a2}$, determines the non-legacy ACK frame format capabilities of device D1, and records the TOA of the FTM_1 frame as time $t_{a2}$ (517).

Then, device D2 may select one of the non-legacy ACK frame formats or a legacy ACK frame format based, at least in part, on the indicated capabilities of device D1 (518). For example, if device D1 indicates that it is not capable of receiving any of the non-legacy ACK frame formats supported by device D2, then device D2 may select the legacy ACK frame format.

Conversely, if device D1 indicates that it is capable of receiving one or more of the non-legacy ACK frame formats supported by device D2, then device D2 may select the non-legacy ACK frame format that achieves the most accurate channel estimates and/or the most accurate ranging accuracy. For one example, if both device D1 and device D2 support the HE protocol, then device D2 may select the HE frame format for transmitting ACK frames during the ranging operation. For another example, if both device D1 and device D2 support the VHT protocol but not the HE protocol, then device D2 may select the VHT frame format for transmitting ACK frames during the ranging operation. For yet another example, if both device D1 and device D2 support the HT protocol but not the VHT or HE protocols, then device D2 may select the HT frame format for transmitting ACK frames during the ranging operation. Otherwise, if device D1 does not support receiving ACK frames in any of the non-legacy ACK frame formats, then device D2 may select the legacy (e.g., non-HT) frame format for transmitting ACK frames during the ranging operation.

In some aspects, device D2 may compare bits in the ACK capabilities field of the received FTM_1 frame with corresponding bits in the ACK capabilities field that was embedded within the FTM_REQ frame to determine which of the non-legacy ACK frame formats are supported by both device D1 and device D2, and then select the non-legacy ACK frame format that results in the most accurate channel estimates and/or the most accurate ranging accuracy.

Device D2 then transmits an ACK frame in the selected frame format to device D1 at time $t_{a3}$, and records the TOD of the ACK frame as time $t_{a3}$ (519). Device D1 receives the ACK frame from device D2 at time $t_{a4}$, and records the TOA of the ACK frame as time $t_{a4}$ (520).

Then, device D1 may embed a time value in an FTM_2 frame, and transmit the FTM_2 frame to device D2 at time $t_{b1}$ (521). For the example of FIG. 5A, the time value is depicted as including the TOD of the FTM_1 frame transmitted from device D1 (e.g., time $t_{a1}$) and the TOA of the ACK frame received at device D1 (e.g., time $t_{a4}$). In other words, device D1 embeds the time stamps $t_{a1}$ and $t_{a4}$ into the FTM_2 frame. For other implementations, the time value may indicate a difference in time between the TOA of the ACK frame received at device D1 and the TOD of the FTM_1 frame transmitted from device D1 (e.g., $t_{value} = t_{a4} - t_{a1}$). In some aspects, device D1 may record the TOD of the FTM_2 frame as time $t_{b1}$.

Device D2 receives the FTM_2 frame at time $t_{b2}$, and decodes the embedded time value (522). At this point, device D2 may determine the distance between device D1 and device D2 (523). More specifically, device D2 may determine that it is a distance $d=c*RTT/2$ from device D1, where $RTT=(t_{a4}-t_{a3})+(t_{a2}-t_{a1})$.

Referring again to FIG. 5A, device D2 may transmit an ACK frame in the selected frame format to device D1 at time $t_{b3}$ (e.g., to acknowledge reception of the FTM_2 frame). Device D1 receives the ACK frame at time $t_{b4}$, and may record the TOA of the ACK frame as time $t_{b4}$. Device D1 may embed another time value in an FTM_3 frame, and then transmit the FTM_3 frame to device D2 at time $t_{b1}$. The time value embedded in the FTM_3 frame may indicate a difference time value equal to $t_{b4}-t_{b1}$. This process may continue for any number of subsequent FTM and ACK frame exchanges between devices D1 and D2, for example, where device D1 embeds the timestamps of a given FTM and ACK frame exchange into a subsequent FTM frame transmitted to device D2. In some aspects, ranging accuracy may improve as the number of FTM and ACK frame exchanges increases.

As described above, the example embodiments may allow an initiator device (e.g., device D2) to not only request a ranging operation with a responder device (e.g., device D1) but also indicate a number of types of non-legacy ACK frame formats supported by device D1. Because non-legacy ACK frames may be transmitted using more OFDM tones than legacy ACK frames, the example ranging operation 500 disclosed herein may achieve more accurate channel estimates and more accurate RTT values than the example ranging operation 400 of FIG. 4. In addition, if both device D1 and device D2 support HE ACK frames, then the example ranging operation 500 may achieve even greater accuracy in long delay spread channels resulting from the longer guard intervals utilized by HE frame transmissions.

Figure 5C:
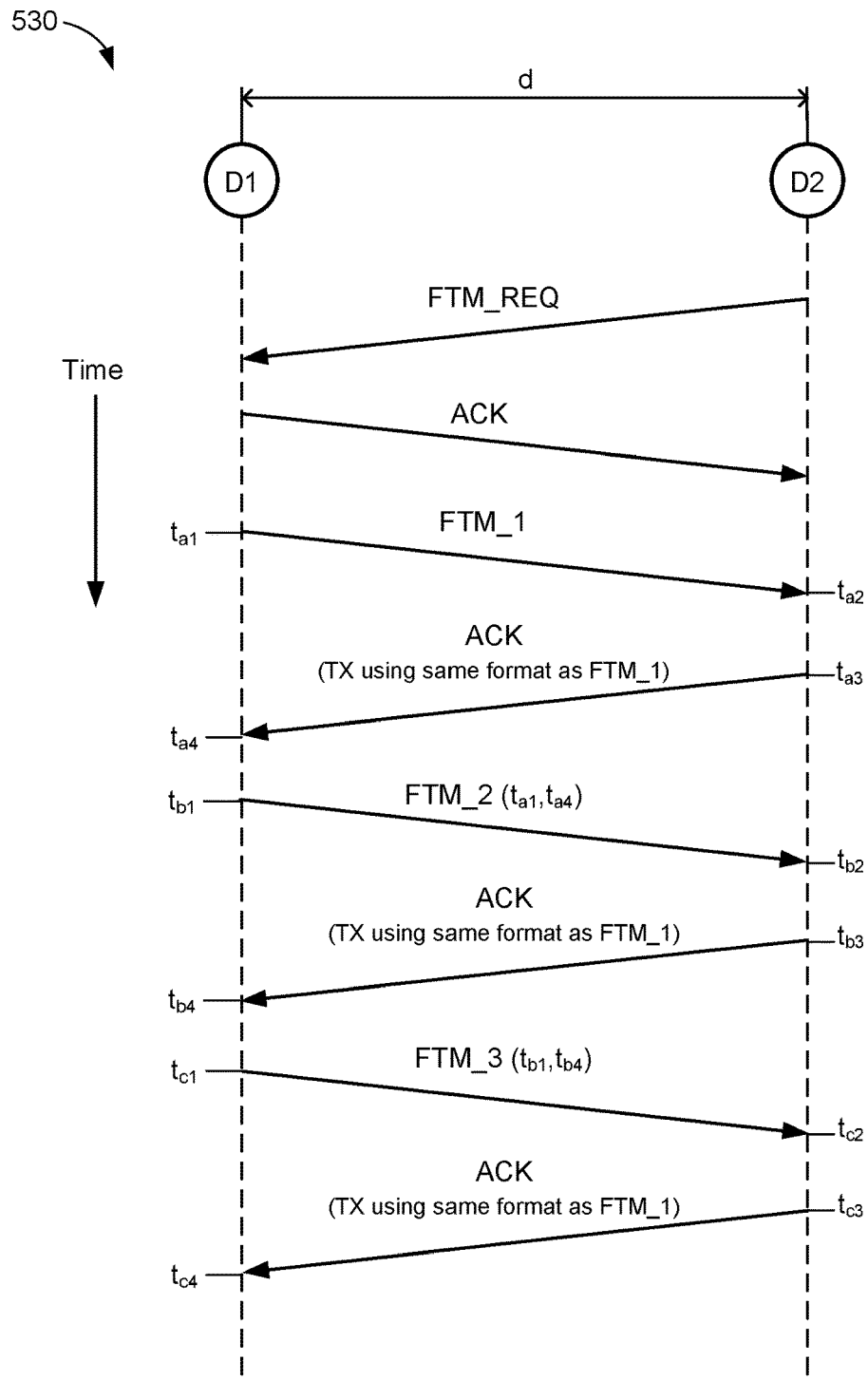
FIG. 5C is a signal diagram of another ranging operation in accordance with example embodiments.
Figure 5D:
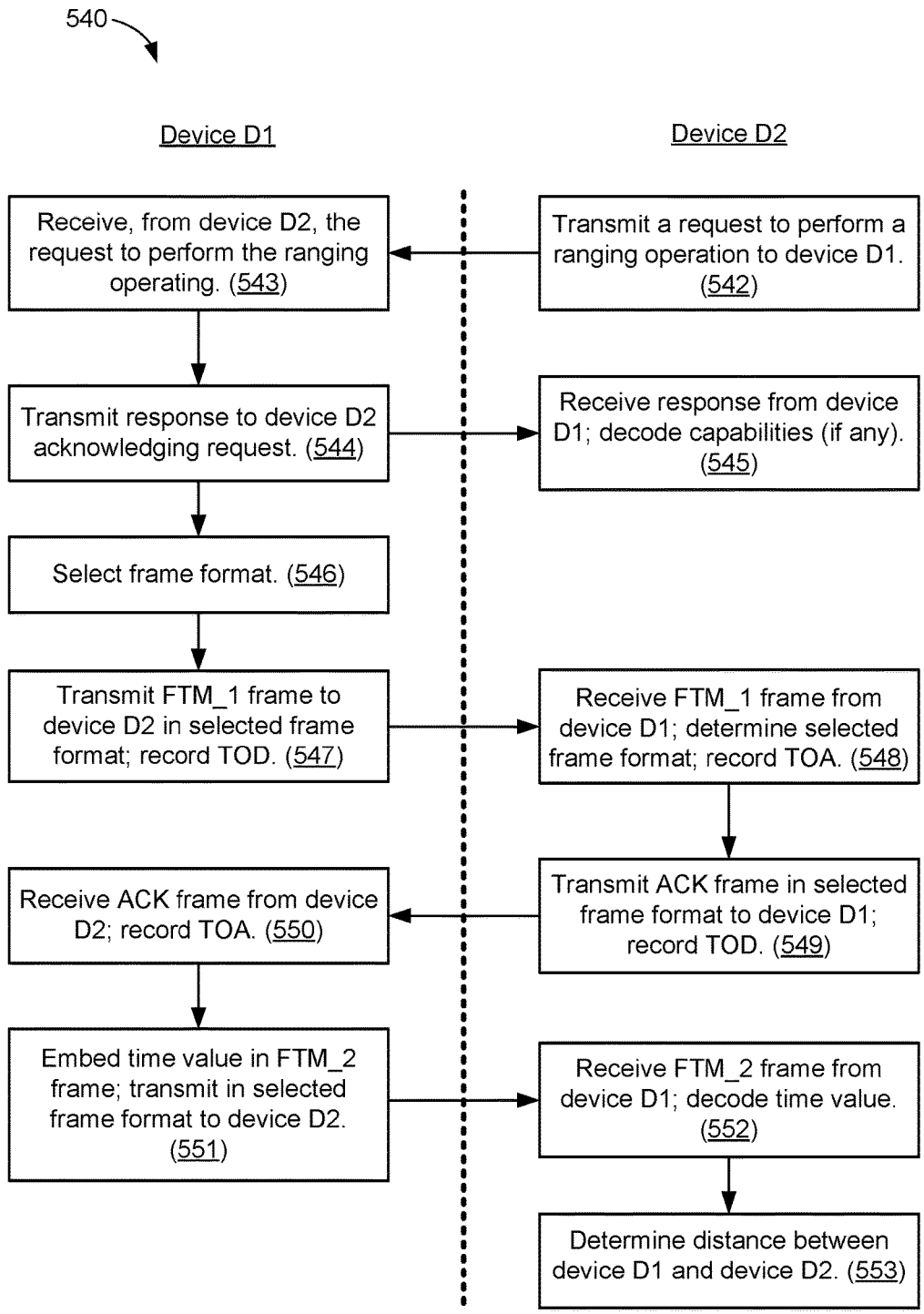
FIG. 5D is a sequence diagram depicting the ranging operation of FIG. 5C in accordance with example embodiments.

For other embodiments, the initiator device may not indicate its ACK frame format or protocol capabilities, but instead transmit ACK frames using the same frame format used by the responder device to transmit the first FTM frame. For example, FIG. 5C shows a signal diagram of another ranging operation 530 between device D1 and device D2 in accordance with example embodiments, and FIG. 5D shows a sequence diagram 540 depicting the example ranging operation 530 of FIG. 5C. Device D1 and device D2 may each be, for example, an access point (e.g., AP 110 of FIG. 1), a station (e.g., one of stations STA1-STA4 of FIG. 1), or another suitable wireless device (e.g., wireless device 200 of FIG. 2).

As the initiator device, device D2 may transmit a request to perform a ranging operation to device D1 (542). For some implementations, the request may be an FTM_REQ frame, as depicted in FIG. 5C. Device D1 may receive the request to perform the ranging operation (543). As the responder device, device D1 may respond to the request by transmitting a response to device D2 (544). For some implementations, the response may be an ACK frame, as depicted in FIG. 5C. The ACK frame may acknowledge the requested ranging operation, and may indicate a number of ranging capabilities of device D1. Device D2 may receive the response from device D1, and decode the capabilities (if any) provided by device D1 (545).

After the above handshake process, devices D1 and D2 may exchange FTM and ACK frames to perform the ranging operation 530. Device D1 may select a frame format for subsequent FTM frames (546). For example, device D1 may select an HE frame format, a VHT frame format, or HT frame format (or any other suitable non-legacy frame format). In some aspects, device D1 may embed an indication of the selected frame format into a capabilities field included within or appended to the FTM_1 frame.

Then, at time $t_{a1}$, device D1 may transmit the FTM_1 frame in the selected frame format to device D2, and record the TOD of the FTM_1 frame as time $t_{a1}$ (547). Device D2 receives the FTM_1 frame from device D1 at time $t_{a2}$, determines the selected frame format of the received FTM_1 frame, and records the TOA of the FTM_1 frame as time $t_{a2}$ (548). In some aspects, device D2 may determine the selected frame format by decoding the preamble of the FTM_1 frame. In other aspects, the selected frame format may be indicated in the FTM_1 frame (e.g., in a capabilities field included within or appended to the FTM_1 frame). For still other aspects, device D1 may indicate the frame format to be used during the ranging operation in one or more transmitted (e.g., broadcasted) beacon frames.

Device D2 then transmits an ACK frame in the selected frame format to device D1 at time $t_{a3}$, and records the TOD of the ACK frame as time $t_{a3}$ (549). Thus, in accordance with some embodiments, device D2 may automatically transmit the ACK frame using the same frame format or protocol used by device D1 to transmit the FTM_1 frame. For example, if device D1 transmits the FTM_1 frame according to the HE protocol, then device D2 responds with HE ACK frames; if device D1 transmits the FTM_1 frame according to the VHT protocol, then device D2 responds with VHT ACK frames; if device D1 transmits the FTM_1 frame according to the HT protocol, then device D2 responds with HT ACK frames. If device D2 does not support transmitting ACK frames in at least one of the non-legacy ACK frame formats, then device D2 may transmit legacy ACK frames to device D1 during the ranging operation.

Device D1 receives the ACK frame from device D2 at time $t_{a4}$, and records the TOA of the ACK frame as time $t_{a4}$ (550). Then, device D1 may embed a time value in an FTM_2 frame, and transmit the FTM_2 frame to device D2 at time $t_{b1}$ (551). As depicted in FIG. 5C, device D1 may embed the timestamps $t_{a1}$ and $t_{a4}$ in the FTM_2 frame. For other implementations, the time value embedded in the FTM_2 frame may indicate a difference in time between the TOA of the ACK frame received at device D1 and the TOD of the FTM_1 frame transmitted from device D1 (e.g., $t_{value}=t_{a4}-t_{a1}$). In some aspects, device D1 may record the TOD of the FTM_2 frame as time $t_{b1}$.

Device D2 receives the FTM_2 frame at time $t_{b2}$, and decodes the embedded time value (552). At this point, device D2 may determine the distance between device D1 and device D2 (553). The distance may be determined as $d=c*RTT/2$, where $RTT=(t_{a4}-t_{a1})+(t_{a2}-t_{a1})$.

Figure 6:
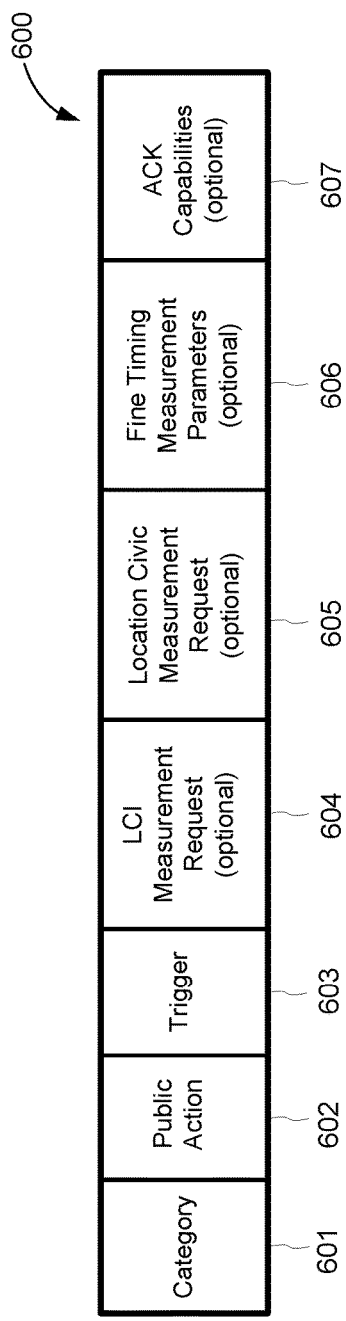
FIG. 6 depicts an example FTM Request frame in accordance with example embodiments.

FIG. 6 shows an example FTM_REQ frame 600 in accordance with example embodiments. The FTM_REQ frame 600 may be used in the example ranging operation 500 of FIG. 5A and/or in the example ranging operation 530 of FIG. 5C. The FTM_REQ frame 600 may include a category field 601, a public action field 602, a trigger field 603, an optional location civic information (LCI) measurement request field 604, an optional location civic measurement request field 605, an optional FTM parameters field 606, and an optional ACK capabilities field 607. The fields 601-606 of the FTM_REQ frame 600 are well-known, and therefore are not discussed in detail herein. In some aspects, the ACK capabilities field 607 may store information indicating whether an initiator device (e.g., device D2 of FIG. 5A) supports transmitting ACK frames in the HE format, the VHT format, and/or the HT format (or any other suitable non-legacy format). In other aspects, information stored in the ACK capabilities field 607 may indicate a specific ACK frame format preferred or selected by the initiator device.

Figure 7:
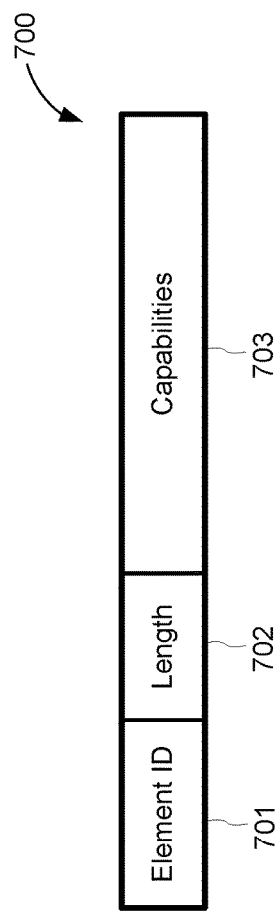
FIG. 7 depicts an example ACK capabilities field in accordance with example embodiments.

FIG. 7 depicts an example field 700 that may be one embodiment of the ACK capabilities field 607 of the FTM_REQ frame 600 of FIG. 6. The field 700 may include an Element ID field 701, a Length field 702, and an ACK capabilities field 703. For at least one embodiment, the Element ID field 701 may include one byte, the Length field 702 may include one byte, and the ACK capabilities field 703 may include one byte (although for other embodiments, other field lengths may be used). The Element ID field 701 may store an element ID value indicating that field 700 contains ACK capabilities for an associated device (e.g., for the initiator device D2 of FIG. 5A). The Length field 702 may store a value indicating a length (in bytes) of field 700. The ACK capabilities field 703 may store information indicating whether the associated device supports the transmission of ACK frames in the HE format, the VHT format, and/or the HT format. In some aspects, the ACK capabilities field 703 may store a bitmap, for example, as depicted below in Table 1.

TABLE 1

| Bit | Value | Indication |
|---|---|---|
| 0 | 1 | Supports ACK in HE format |
|   | 0 | Does not support ACK in HE format |
| 1 | 1 | Supports ACK in VHT format |
|   | 0 | Does not support ACK in VHT format |

TABLE 1-continued

| Bit | Value | Indication |
|-----|-------|------------|
| 2   | 1     | Supports ACK in HT format |
|     | 0     | Does not support ACK in HT format |
| 3-7 | 0     | reserved |

As indicated above in Table 1, the value of bit 0 ($b_0$) may indicate whether the associated device is capable of transmitting ACK frames in the HE format, where $b_0=1$ indicates that the associated device supports HE ACK frames, and $b_0=0$ indicates that the associated device does not support HE ACK frames. The value of bit 1 ($b_1$) may indicate whether the associated device is capable of transmitting ACK frames in the VHT format, where $b_1=1$ indicates that the associated device supports VHT ACK frames, and $b_1=0$ indicates that the associated device does not support VHT ACK frames. The value of bit 2 ($b_2$) may indicate whether the associated device is capable of transmitting ACK frames in the HT format, where $b_2=1$ indicates that the associated device supports HT ACK frames, and $b_2=0$ indicates that the associated device does not support HT ACK frames. The remaining bits, $b_3$-$b_7$, may be reserved. For other implementations, the relationship between bit positions in the example bitmap of Table 1 and ACK frame formats or protocols may be different than depicted in the example of Table 1.

When a responder device (e.g., device D1 of FIG. 5A) receives an FTM_REQ frame containing field 700, the responder device may decode the bitmap contained in the ACK capabilities field 703 to determine which ACK frame formats are supported by the initiator device. As mentioned above, in some aspects, the ACK capabilities field 703 may indicate all of the non-legacy ACK frame formats supported by the initiator device (e.g., more than one of bits $b_0$-$b_2$ may be asserted to a logic high or "1" state). In response thereto, the responder device may indicate, to the initiator device, its capabilities of receiving ACK frames transmitted in one or more of the non-legacy ACK frame formats supported by the initiator device.

In other aspects, the ACK capabilities field 703 may indicate a desired or preferred non-legacy ACK frame format that is supported by the initiator device (e.g., only one of bits $b_0$-$b_2$ may be asserted to a logic high or "1" state). In response thereto, the responder device may either accept or reject the desired or preferred non-legacy ACK frame format specified by the initiator device.

FIG. 8 depicts an example FTM frame 800, in accordance with example embodiments. The FTM frame 800 may be used in the example ranging operation 500 of FIG. 5A and/or in the example ranging operation 530 of FIG. 5C. The FTM frame 800 may include a category field 801, a public action field 802, a dialog token field 803, a follow up dialog token field 804, a TOD field 805, a TOA field 806, a TOD error field 807, a TOA error field 808, an optional LCI report field 809, an optional location civic report field 810, an optional FTM parameters field 811, and an optional ACK capabilities field 812. The fields 801-811 of the FTM frame 800 are well-known, and therefore are not discussed in detail herein. The ACK capabilities field 812 may store information indicating whether a responder device (e.g., device D1 of FIG. 5A) is capable of receiving ACK frames transmitted in one or more non-legacy ACK frame formats.

The ACK capabilities field 812 of the FTM frame 800 may be the example field 700 depicted in FIG. 7. Thus, for at least some embodiments, the ACK capabilities field 703 of field 700, when embedded within FTM frame 800, may indicate the capabilities of the responder device to receive ACK frames transmitted using one or more of the non-legacy ACK frame formats supported by the initiator device. In some aspects, the FTM frame 800 (e.g., when used as the FTM_1 frame) may include an ACK capabilities field 703 containing a bitmap depicted below in Table 2.

TABLE 2

| Bit | Value | Indication |
|-----|-------|------------|
| 0   | 1     | Supports ACK in HE format |
|     | 0     | Does not support ACK in HE format |
| 1   | 1     | Supports ACK in VHT format |
|     | 0     | Does not support ACK in VHT format |
| 2   | 1     | Supports ACK in HT format |
|     | 0     | Does not support ACK in HT format |
| 3-7 | 0     | reserved |

As indicated above in Table 2, the value of bit 0 ($b_0$) may indicate whether the responder device is capable of receiving ACK frames in the HE format, where $b_0=1$ indicates that the responder device is able to receive HE ACK frames, and $b_0=0$ indicates that the responder device is not able to receive HE ACK frames. The value of bit 1 ($b_1$) may indicate whether the responder device is capable of receiving ACK frames in the VHT format, where $b_1=1$ indicates that the responder device is able to receive VHT ACK frames, and $b_1=0$ indicates that the responder device is not able to receive VHT ACK frames. The value of bit 2 ($b_2$) may indicate whether the responder device is capable of receiving ACK frames in the HT format, where $b_2=1$ indicates that the responder device is able to receive HT ACK frames, and $b_2=0$ indicates that the responder device is not able to receive HT ACK frames. The remaining bits, $b_3$-$b_7$, may be reserved. For other implementations, the relationship between bit positions in the bitmap and ACK frame formats or protocols may be different than depicted in the example of Table 2.

FIG. 9 shows an example ACK frame 900 that may be used in accordance with the example embodiments. In some aspects, the ACK frame 900 may be used as the ACK frames depicted in the example ranging operation 500 of FIG. 5A and/or the example ranging operation 530 of FIG. 5C. The example ACK frame 900 may include a 2-byte frame control field 901, a 2-byte duration field 902, a 6-byte receiver address (RA) field 903, and a 4-byte frame control sequence (FCS) field 904. Although not shown in FIG. 9 for simplicity, the frame control field 901 may include a 2-bit frame Type field and a 4-bit Sub type field that together may store information indicating that the example frame 900 of FIG. 9 is an ACK frame. For other embodiments, the field lengths of the example ACK frame 900 may be of other suitable values. The duration field 902 stores a value indicating a length of the ACK frame 900, the RA field 903 stores an address identifying the recipient of the ACK frame, and the FCS field 904 stores a frame control sequence.

Figure 10A:
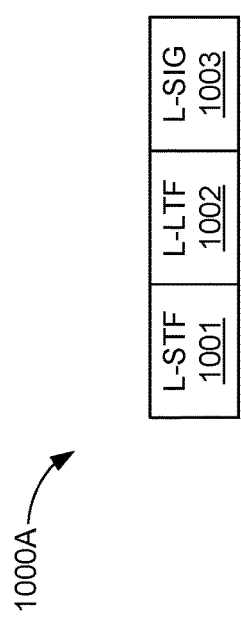
FIG. 10A depicts a legacy preamble of a frame that may be transmitted in accordance with example embodiments.

FIG. 10A shows an example preamble 1000A of a non-HT (e.g., legacy) frame within which the ACK frame 900 of FIG. 9 may be encapsulated, for example, to transmit a non-HT ACK frame to a responder device during ranging operations disclosed herein (for simplicity, the frame body is not shown in FIG. 10A). The preamble 1000A, which may be compliant with the IEEE 802.11a/g standards, is shown to include a Legacy Short Training Field (L-STF) 1001, a Legacy Long Training Field (L-LTF) field 1002, and a Legacy Signal (L-SIG) field 1003. A receiving device may use information contained in the L-STF 1001 for coarse frequency estimation, automatic gain control, and timing recovery, and may use information contained in the L-LTF 1002 for fine frequency estimation as well as channel estimation and fine timing recovery. Information contained in the L-SIG field 1003 may be used to convey modulation and coding information.

Figure 10B:
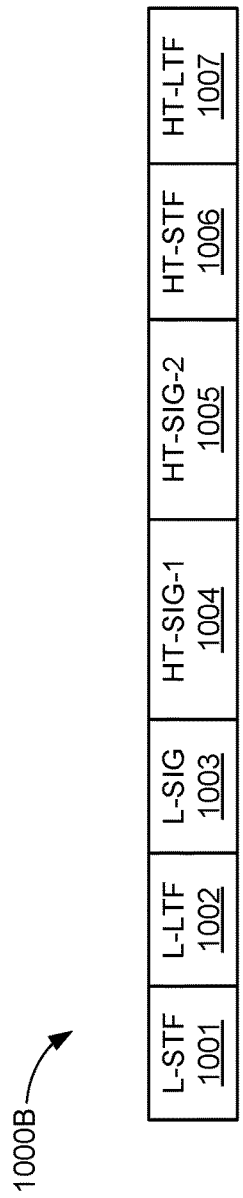
FIG. 10B depicts a high throughput (HT) preamble of a frame that may be transmitted in accordance with example embodiments.

FIG. 10B shows an example preamble 1000B of an HT frame within which the ACK frame 900 of FIG. 9 may be encapsulated, for example, to transmit an HT ACK frame to a responder device during ranging operations disclosed herein (for simplicity, the frame body is not shown in FIG. 10B). The preamble 1000B, which may be compliant with the IEEE 802.11n standards, is shown to include the L-STF 1001, L-LTF 1002, and L-SIG field 1003 of FIG. 10A, as well as a first HT Signal (HT-SIG-1) field 1004, a second HT Signal (HT-SIG-2) field 1005, an HT Short Training Field (HT-STF) 1006, and an HT Long Training Field (HT-LTF) 1007. The HT-SIG fields 1004-1005 may be used to convey modulation and coding information, as well as the channel bandwidths, for HT transmissions. Information contained in the HT-STF 1006 may be used to improve automatic gain control estimates for MIMO communications, and information contained in the HT-LTF 1007 may be used to estimate MIMO channel conditions.

FIG. 10C shows an example preamble 1000C of a VHT frame within which the ACK frame 900 of FIG. 9 may be encapsulated, for example, to transmit a VHT ACK frame to a responder device during ranging operations disclosed herein (for simplicity, the frame body is not shown in FIG. 10C). The preamble 1000C, which may be compliant with the IEEE 802.11ac standards, is shown to include the L-STF 1001, L-LTF 1002, and L-SIG field 1003 of FIG. 10A, as well as a set of VHT Signal-A (VHT-SIG-A) fields 1014 and 1015, a VHT Short Training Field (VHT-STF) 1016, a VHT Long Training Field (VHT-LTF) 1017, and a VHT Signal B (VHT-SIG-B) field 1018. The VHT-SIG-A fields 1014-1015 may be used to convey modulation and coding information, channel bandwidths, SU-MIMO information, MU-MIMO information, beamforming information, and other suitable information for VHT transmissions. Information contained in the VHT-STF 1016 may be used to improve automatic gain control estimates for SU-MIMO and MU_MIMO communications, and information contained in the VHT-LTF 1017 may be used to estimate various MIMO channel conditions. The VHT-SIG-B field 1018 may include additional SU-MIMO and MU-MIMO information including, for example, user-specific information and the number of spatial streams associated with a given frame transmission.

FIG. 10D shows an example preamble 1000D of an HE frame within which the ACK frame 900 of FIG. 9 may be encapsulated, for example, to transmit an HE ACK frame to a responder device during ranging operations disclosed herein (for simplicity, the frame body is not shown in FIG. 10D). The preamble 1000D, which may be compliant with the IEEE 802.11ax standards, is shown to include the L-STF 1001, L-LTF 1002, and L-SIG field 1003 of FIG. 10A, as well as a Repeated Legacy Signal (RL-SIG) field 1024, a set of HE Signal-A (HE-SIG-A1/HE-SIG-A2) fields 1025, an HE Signal B (HE-SIG-B) field 1026, an HE Short Training Field (HE-STF) 1027, and an HE Long Training Field (HE-LTF) 1028. The HE-SIG-A1 and HE-SIG-A2 fields 1025 may include parameters such as an indicated bandwidth, a payload guard interval (GI), a coding type, a number of spatial streams (Nsts), a space-time block coding (STBC), beamforming information, and so on. Information contained in the HE-STF 1027 may be used to improve automatic gain control estimates for SU-MIMO and MU_MIMO communications, and information contained in the HE-LTF 1028 may be used to estimate various MIMO channel conditions.

Figure 11:
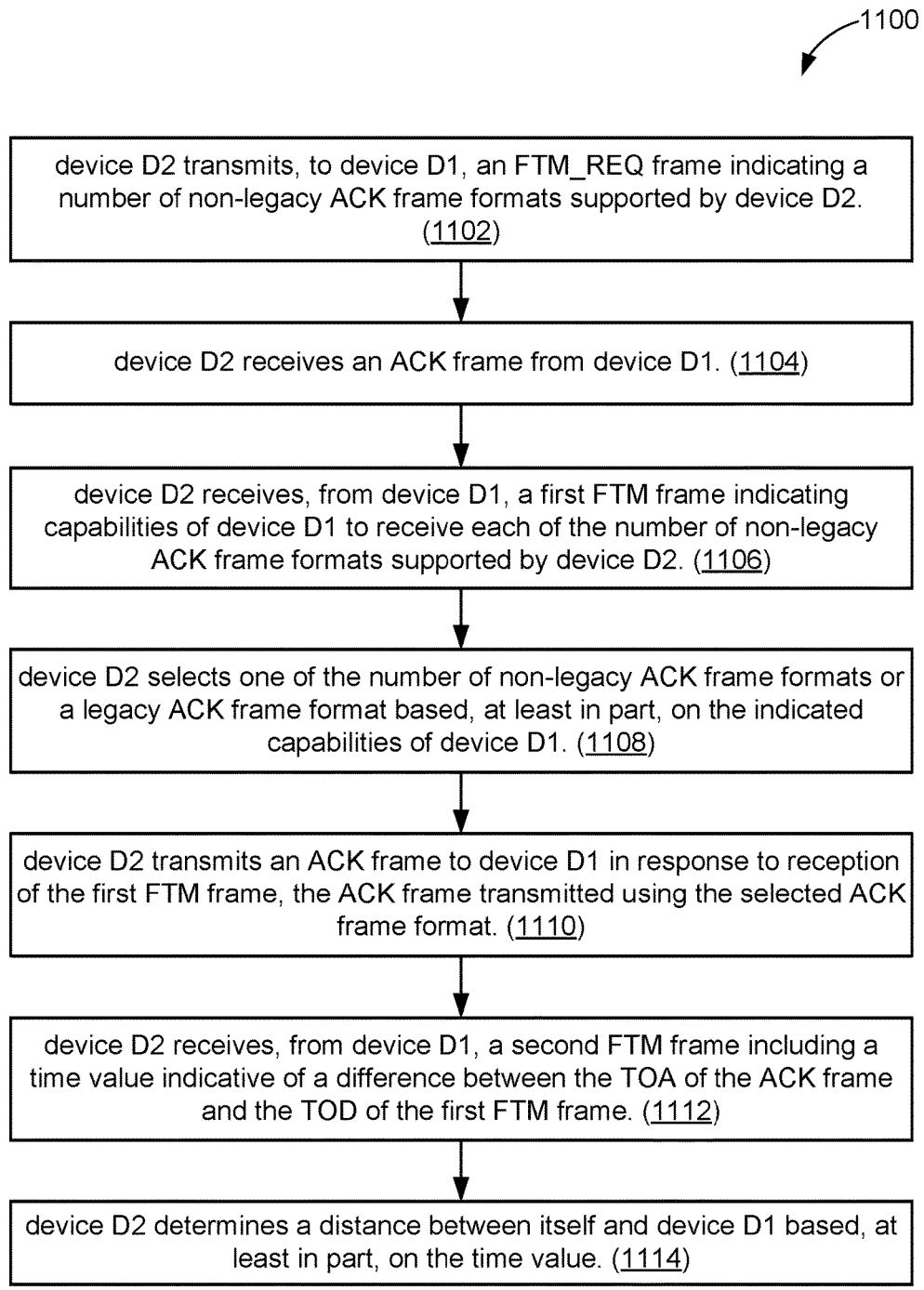
FIG. 11 shows an illustrative flowchart depicting an example ranging operation in accordance with example embodiments.

FIG. 11 is an illustrative flow chart 1100 depicting a second device D2 requesting or initiating a ranging operation with a first device D1 in accordance with example embodiments. Device D1 and device D2 may each be, for example, an access point (e.g., AP 110 of FIG. 1), a station (e.g., one of stations STA1-STA4 of FIG. 1), or other suitable wireless device (e.g., wireless device 200 of FIG. 2). For the example operation of FIG. 11, device D2 is the initiator device, and device D1 is the responder device.

First, device D2 may transmit, to device D1, an FTM_REQ frame indicating a number of types of non-legacy ACK frame formats supported by device D2 (1102). As discussed above, the non-legacy ACK frame formats may include or otherwise be associated with a high efficiency (HE) protocol, a very high throughput (VHT) protocol, and a high throughput (HT) protocol (or any other suitable non-legacy protocol). For some implementations, the FTM_REQ frame may be the FTM_REQ frame 600 of FIG. 6, and the indication of the non-legacy ACK frame formats supported by device D2 may be embedded within the ACK capabilities field 607 of FTM_REQ frame 600. The FTM_REQ frame may also include a request to initiate the ranging operation (e.g., the ranging operation 500 of FIG. 5A). Device D2 may receive, from device D1, an ACK frame acknowledging receipt of the FTM_REQ frame (1104).

Next, device D2 may receive, from device D1, a first FTM frame indicating capabilities of device D1 to receive each of the number of types of non-legacy ACK frame formats supported by device D2 (1106). For some implementations, the first FTM frame may be the FTM frame 800 of FIG. 8, and the indicated capabilities of device D1 may be embedded within the ACK capabilities field 812 of FTM frame 800.

Device D2 may select one of the number of types of non-legacy ACK frame formats or a legacy ACK frame format based, at least in part, on the indicated capabilities of device D1 (1108). For example, if device D1 indicates that it is not capable of receiving any of the non-legacy ACK frame formats supported by device D2, then device D2 may select the legacy ACK frame format. Conversely, if device D1 indicates that it is capable of receiving one or more of the non-legacy ACK frame formats supported by device D2, then device D2 may select the non-legacy ACK frame format that is associated with the highest number of OFDM tones and that is supported by device D1. In some aspects, device D2 may compare bits in the ACK capabilities field of the received FTM frame with corresponding bits in the ACK capabilities field of the FTM_REQ frame to determine which of the non-legacy ACK frame formats are supported by both device D1 and device D2, and then select the non-legacy ACK frame format that results in the most accurate channel estimates and/or the most accurate ranging accuracy.

Next, device D2 may transmit an ACK frame to device D1 in response to reception of the first FTM frame, the ACK frame transmitted using the selected ACK frame format (1110). In this manner, if the selected ACK frame format is an HE, VHT, or HT format, then the ranging operation between device D1 and device D2 may provide more accurate RTT estimates than conventional ranging operations that use legacy ACK frame formats (e.g., the example ranging operation 400 of FIG. 4).

Thereafter, device D2 may receive, from device D1, a second FTM frame including a time value indicative of a difference in time between the time of arrival (TOA) of the ACK frame and the time of departure (TOD) of the first FTM frame (1112). Device D2 may then determine a distance between device D1 and device D2 based, at least in part, on the time value (1114).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of initiating a ranging operation between a first device and a second device, the method performed by the second device and comprising:
    transmitting, to the first device, a fine timing measurement (FTM) request frame including a capabilities field that indicates a number of types of non-legacy acknowledgement (ACK) frame formats supported by the second device;
    receiving, from the first device, a first FTM frame including a capabilities field that indicates capabilities of the first device to receive each of the number of types of non-legacy ACK frame formats supported by the second device;
    selecting one of the number of types of non-legacy ACK frame formats or a legacy ACK frame format based, at least in part, on the indicated capabilities of the first device;
    transmitting an ACK frame to the first device in response to reception of the first FTM frame, the ACK frame transmitted using the selected ACK frame format;
    receiving, from the first device, a second FTM frame including a time value indicative of a difference in time between a time of arrival (TOA) of the ACK frame and a time of departure (TOD) of the first FTM frame; and
    determining a distance between the first and second devices based, at least in part, on the time value.

2. The method of claim 1, wherein the number of types of non-legacy ACK frame formats comprises one or more members of the group consisting of a high efficiency (HE) protocol, a very high throughput (VHT) protocol, and a high throughput (HT) protocol, and the legacy ACK frame format comprises a non-HT protocol.

3. The method of claim 2, wherein the HE protocol is compliant with an IEEE 802.11ax standard, the VHT protocol is compliant with an IEEE 802.11ac standard, the HT protocol is compliant with an IEEE 802.11n standard, and the non-HT protocol is compliant with an IEEE 802.11a/g standard.

4. The method of claim 1, wherein the second device selects the legacy ACK frame format based on the first device indicating an inability to receive any of the non-legacy ACK frame formats supported by the second device.

5. The method of claim 1, wherein the second device selects the non-legacy ACK frame format that is associated with the highest number of orthogonal frequency division multiplexing (OFDM) tones and that is supported by the first device.

6. The method of claim 1, further comprising:
    including, in a beacon frame, capability information indicating the number of types of non-legacy ACK frame formats supported by the second device; and
    transmitting the beacon frame.

7. The method of claim 6, wherein the capability information is included within an information element (IE) of the beacon frame.

8. The method of claim 1, further comprising:
    receiving, from the first device, a beacon frame indicating capabilities of the first device to receive one or more types of non-legacy ACK frame formats.

9. A second device to initiate a ranging operation with a first device, the second device comprising:
    one or more processors; and
    a memory configured to store instructions that, when executed by the one or more processors, causes the second device to:
    transmit, to the first device, a fine timing measurement (FTM) request frame including a capabilities field that indicates a number of types of non-legacy acknowledgement (ACK) frame formats supported by the second device;
receive, from the first device, a first FTM frame including a capabilities field that indicates capabilities of the first device to receive each of the number of types of non-legacy ACK frame formats supported by the second device;
select one of the number of types of non-legacy ACK frame formats or a legacy ACK frame format based, at least in part, on the indicated capabilities of the first device;
transmit an ACK frame to the first device in response to reception of the first FTM frame, the ACK frame transmitted using the selected ACK frame format;
receive, from the first device, a second FTM frame including a time value indicative of a difference in time between a time of arrival (TOA) of the ACK frame and a time of departure (TOD) of the first FTM frame; and
determine a distance between the first and second devices based, at least in part, on the time value.

10. The second device of claim 9, wherein execution of the instructions causes the second device to select the legacy ACK frame format based on the first device indicating an inability to receive any of the non-legacy ACK frame formats supported by the second device.

11. The second device of claim 9, wherein execution of the instructions causes the second device to select the non-legacy ACK frame format that is associated with the highest number of orthogonal frequency division multiplexing (OFDM) tones and that is supported by the first device.

12. The second device of claim 9, wherein execution of the instructions further causes the second device to:
include, in a beacon frame, capability information indicating the number of types of non-legacy ACK frame formats supported by the second device; and
transmit the beacon frame.

13. The second device of claim 12, wherein the capability information is included within an information element (IE) of the beacon frame.

14. The second device of claim 9, wherein execution of the instructions further causes the second device to:
receive, from the first device, a second FTM frame including a time value indicative of a difference in time between a time of arrival (TOA) of the ACK frame and a time of departure (TOD) of the first FTM frame; and
determine a distance between the first and second devices based, at least in part, on the time value.

15. A non-transitory computer-readable storage medium storing one or more programs containing instructions that, when executed by one or more processors of a second device, cause the second device to initiate a ranging operation with a first device by performing operations comprising:
transmitting, to the first device, a fine timing measurement (FTM) request frame including a capabilities field that indicates a number of types of non-legacy acknowledgement (ACK) frame formats supported by the second device;
receiving, from the first device, a first FTM frame including a capabilities field that indicates capabilities of the first device to receive each of the number of types of non-legacy ACK frame formats supported by the second device;
selecting one of the number of types of non-legacy ACK frame formats or a legacy ACK frame format based, at least in part, on the indicated capabilities of the first device;
transmitting an ACK frame to the first device in response to reception of the first FTM frame, the ACK frame transmitted using the selected ACK frame format;
receiving, from the first device, a second FTM frame including a time value indicative of a difference in time between a time of arrival (TOA) of the ACK frame and a time of departure (TOD) of the first FTM frame; and
determining a distance between the first and second devices based, at least in part, on the time value.

16. The non-transitory computer-readable storage medium of claim 15, wherein execution of the instructions causes the second device to select the legacy ACK frame format based on the first device indicating an inability to receive any of the non-legacy ACK frame formats supported by the second device.

17. The non-transitory computer-readable storage medium of claim 15, wherein execution of the instructions causes the second device to select the non-legacy ACK frame format that is associated with the highest number of orthogonal frequency division multiplexing (OFDM) tones and that is supported by the first device.

18. The non-transitory computer-readable storage medium of claim 15, wherein execution of the instructions causes the second device to perform operations further comprising:
including, in a beacon frame, capability information indicating the number of types of non-legacy ACK frame formats supported by the second device; and
transmitting the beacon frame.

19. A second device to initiate a ranging operation with a first device, the second device comprising:
means for transmitting, to the first device, a fine timing measurement (FTM) request frame including a capabilities field that indicates a number of types of non-legacy acknowledgement (ACK) frame formats supported by the second device;
means for receiving, from the first device, a first FTM frame including a capabilities field that indicates capabilities of the first device to receive each of the number of types of non-legacy ACK frame formats supported by the second device;
means for selecting one of the number of types of non-legacy ACK frame formats or a legacy ACK frame format based, at least in part, on the indicated capabilities of the first device;
means for transmitting an ACK frame to the first device in response to reception of the first FTM frame, the ACK frame transmitted using the selected ACK frame format;
means for receiving, from the first device, a second FTM frame including a time value indicative of a difference in time between a time of arrival (TOA) of the ACK frame and a time of departure (TOD) of the first FTM frame; and
means for determining a distance between the first and second devices based, at least in part, on the time value.

20. The second device of claim 19, wherein the second device is to select the legacy ACK frame format based on the first device indicating an inability to receive any of the non-legacy ACK frame formats supported by the second device.

21. The second device of claim 19, wherein the second device is to select the non-legacy ACK frame format that is associated with the highest number of orthogonal frequency division multiplexing (OFDM) tones and that is supported by the first device.

22. The second device of claim 19, further comprising:
means for including, into a beacon frame, capability information indicating the number of types of non-legacy ACK frame formats supported by the second device; and
means for transmitting the beacon frame.

* * * * *